(12) United States Patent
Traff et al.

(10) Patent No.: US 10,614,045 B2
(45) Date of Patent: Apr. 7, 2020

(54) IN-FLIGHT PROCESSING OF OPERATIONS IN A ROLE MUTABLE FILE SYSTEM

(71) Applicant: International Business Machines Corporation, Armonk, NY (US)

(72) Inventors: Robert J. Traff, Rochester, MN (US); Jim C. Chen, Rochester, MN (US); Margaret R. Fenlon, Rochester, MN (US); Charles L. Emig, II, Spring Valley, MN (US); Justin C. Nelson, Rochester, MN (US); Shuang Hong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 15/860,140

(22) Filed: Jan. 2, 2018

(65) Prior Publication Data

US 2019/0205421 A1 Jul. 4, 2019

(51) Int. Cl.

| G06F 17/30 | (2006.01) |
|---|---|
| G06F 16/178 | (2019.01) |
| G06F 9/48 | (2006.01) |
| G06F 16/11 | (2019.01) |
| G06F 16/182 | (2019.01) |
| G06F 11/07 | (2006.01) |

(52) U.S. Cl.
CPC .......... *G06F 16/178* (2019.01); *G06F 9/485* (2013.01); *G06F 11/07* (2013.01); *G06F 16/128* (2019.01); *G06F 16/182* (2019.01)

(58) Field of Classification Search
USPC ................... 707/610, 634; 718/106; 719/318
See application file for complete search history.

(56) References Cited

U.S. PATENT DOCUMENTS

| 5,812,748 | A | 9/1998 | Ohran et al. | |
|---|---|---|---|---|
| 5,987,621 | A | 11/1999 | Duso et al. | |
| 7,769,971 | B2 | 8/2010 | Cremelie et al. | |
| 2003/0009603 | A1* | 1/2003 | Ruths ...................... | G06F 9/465 719/318 |
| 2003/0014513 | A1* | 1/2003 | Ruths ...................... | G06F 9/465 709/223 |
| 2006/0031844 | A1* | 2/2006 | Dice ........................ | G06F 9/52 718/106 |
| 2010/0131465 | A1 | 5/2010 | Deniel | |
| 2012/0144405 | A1 | 6/2012 | Kalagananam et al. | |

* cited by examiner

*Primary Examiner* — Hung T Vy
(74) *Attorney, Agent, or Firm* — Martin & Associates, LLC; Bret J. Petersen

(57) ABSTRACT

A mutation coordinator processes in-flight file operations in a role mutable file system to provide high availability data storage and uninterrupted network request processing. The mutation coordinator uses a container with data received from in-flight operations as they progress past checkpoints to enable the file system to seamlessly mutate between server and client operational roles. The checkpoint functions determine whether the operation should halt at the checkpoint when a mutation begins and log information in the container to reflect the progress of the operation. The halted operations are then completed on the new server when the mutation is complete.

20 Claims, 12 Drawing Sheets

```
func Logical File Operation1 (parm1, parm2, parm3)     }1202

{
int a
int b                                                  }1204
setup ()
sync_checkpoint1 (log results, resume point, operation1-1)   }1206 write c                                                                }1212
clear buffers sync_checkpoint2 (log results, resume point, operation1-2)   }1208 write d
write f                                                                }1212
write g sync_checkpoint3 (log results, resume point, operation1-3)   }1210 verify
return
```

| File Operation Data Structure - Write | |
|---|---|
| OperationID | 5463 |
| OperationType | Write |
| OperationParameterBuffer | starting offset, ending offset |
| TargetObjectAddress | 8AFE98454EE545D0000 |
| OperationSpecificBuffer | Data to be written |
| VnodeBuffer | 8AFE98454EE545D0000 |
| OriginatedOn | ClientFileSystem |
| CheckpointFunctionID | Checkpoint2 |
| Start/ResumeCheckpoint | Checkpoint2 |
| Metadata | Metadata |

IN-FLIGHT PROCESSING OF OPERATIONS IN A ROLE MUTABLE FILE SYSTEM

BACKGROUND

1. Technical Field

This disclosure generally relates to computer data storage systems, and more specifically relates to in-flight processing of operations in a role mutable file system for high availability data storage that provides uninterrupted network request processing.

2. Background Art

Data storage systems seek to provide efficient data storage with high availability to insure data is always available when a customer needs the data. High availability means availability despite planned outages for upgrades or unplanned outages caused by hardware or software failures. Many different systems incorporate various methods to achieve high availability including database backup and duplication, failover systems, memory and storage replication, etc.

Data storage systems often include a data server/client system where a server responds to data requests from a user or customer applications on a client system. When a server fails or needs to be taken off-line it is desirable for the file system to be able to continuously respond to data requests from the applications.

BRIEF SUMMARY

A mutation coordinator processes in-flight file operations in a role mutable file system to provide high availability data storage and uninterrupted network request processing. The mutation coordinator uses a container with data received from in-flight operations as they progress past checkpoints to enable the file system to seamlessly mutate between server and client operational roles. The checkpoint functions determine whether the operation should halt at the checkpoint when a mutation begins and log information in the container to reflect the progress of the operation. The halted operations are then completed on the new server when the mutation is complete.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 12 shows an example of simplified code of the logical file system with check points;

FIG. 13 shows an example of a file operation data structure stored in a container.

DETAILED DESCRIPTION

The disclosure and claims herein relate to a system and method for a mutation coordinator that processes in-flight file operations in a role mutable file system to provide high availability data storage and uninterrupted network request processing. The mutation coordinator uses a container with data received from in-flight operations as they progress past checkpoints to enable the file system to seamlessly mutate between server and client operational roles. The checkpoint functions determine whether the operation should halt at the checkpoint when a mutation begins and log information in the container to reflect the progress of the operation. The halted operations are then completed on the new server when the mutation is complete.

Figure 1:
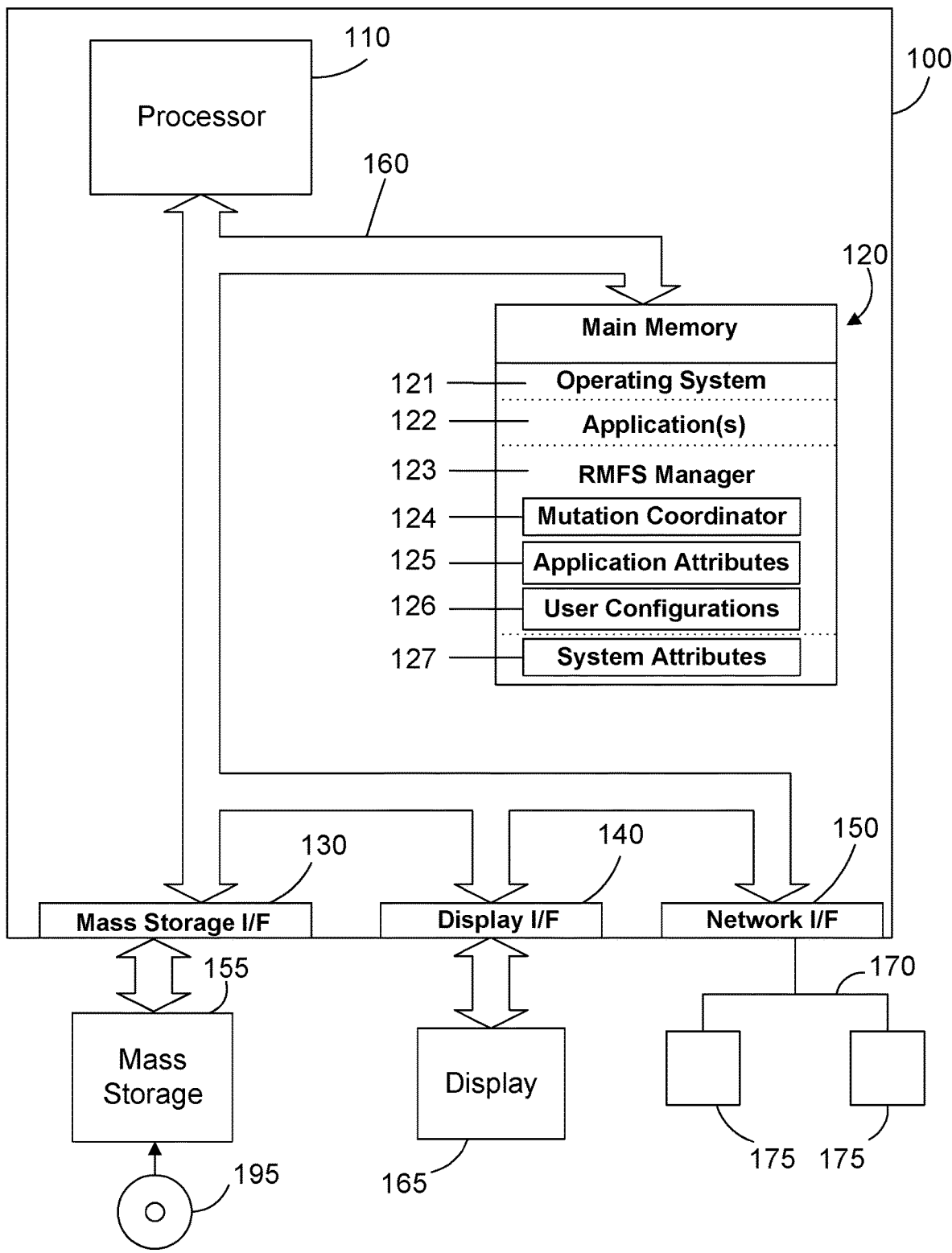
FIG. 1 is a block diagram of a computer system with a role mutable file system manager.

Referring to FIG. 1, a computer system 100 is one suitable implementation of a computer system that is capable of performing the computer operations described herein including a role mutable file system manager 123. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes one or more applications 122. The memory 120 also includes a role mutable file system manager 123 that includes a mutation coordinator 124, application attributes 125, and user configurations 126. The memory may also include system attributes 127.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, applications 122, RMFS manager 123, mutation coordinator 124, application attributes 125, user configurations 126 and system attributes 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g., web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
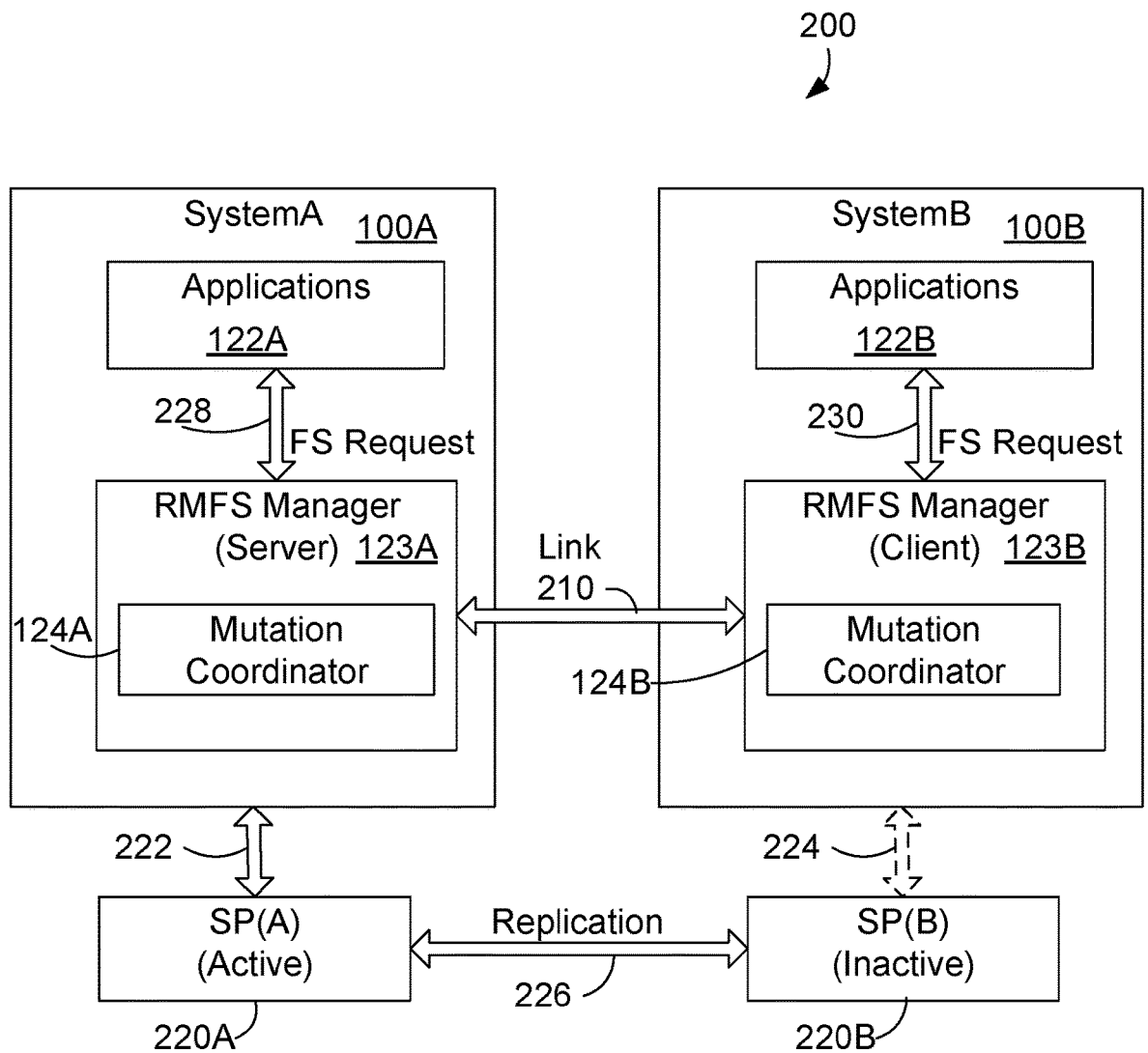
FIG. 2 illustrates another simplified block diagram of a role mutable file system with a first system in the server role and a second system in the client role.

FIG. 2 illustrates a simplified example of a role mutable file system 200 that provides high availability processing of network requests by seamlessly switching between server and client operational roles as described herein. The role mutable filesystem 200 in the illustrated example includes computer systemA 100A connected to computer systemB 100B by a communication link 210. Computer systemA 100A and computer systemB 100B are similar to the computer system 100 described above with reference to FIG. 1. Computer systemA 100A includes one or more applications 122A and an RMFS manager 123A. Similarly, computer system 100B includes one or more applications 122B and an RMFS manager 123B. Computer systemA 100A is connected through connection 222 to storage pool A 220A while computer system 100B is connected through connection 224 to storage pool B 220B. The connections 222, 224 may include physical connections as well as logical layer and physical layers of system software. The contents of storage pools 220A, 220B are mirrored to hold the same data, preferably by hardware replication 226 in a manner known in the prior art. FIG. 2 illustrates a system with just two computer systems as a simplified example. It would be understood by one of ordinary skill in the art that the system could be extended to any number of computer systems.

Further, there could be multiple storage pools and associated RMFS managers in the server role on a single computer system. For simplicity the following examples show a single RMFS manager in the server role.

The RMFS managers 123A, 123B preferably operate at any given time in one of three roles, namely, server, client and stand-alone roles. As referred to herein, a server file system is one where the RMFS manager operates in the server role. The RMFS manager that is configured to the storage drive/pool that is currently active is placed in the server role. The RMFS manager in the server role handles all local requests that originate on that system for operations intended to run against or manipulate the configured storage pool. Additionally the RMFS in the server role will receive requests from one or more paired systems with the RMFS in the client role. Thus the server file system in the server role will handle requests that were intended for the target storage pool which originated from the other system(s). All requests are physically fulfilled by the RMFS manager in the server role. Responses will be sent back to the file system(s) in the client role.

As referred to herein, a client file system is one where the RMFS manager is in the client mode. One or more other file system computers may have an RMFS manager in the client role and while in this role are designated as client file systems. The configured target storage pools in the client file systems are always inactive on their respective system. The target storage pool that is active and associated with the server file system will appear to be local and accessible to the end users from each of the client file systems. Requests that originate from a client file system intended to operate against the storage pool will pass through a communication link to the server file system and physically processed on that system. The response and outcome of the server side processing is received by the client and passed back to the user. From the user's point of view, the operation took place locally on the client file system.

RMFS managers may also operate in a stand-alone role or mode. The stand-alone role occurs when the computer systems in the role mutable file system become detached. This may occur if the configured pairing of the RMFS managers is intentionally disassociated such that they no longer operate as a pair. In this case, the configured storage pool on each system can become active and operate independently on each system. In this mode, each RMFS manager will act as if it is a solitary system in local mode only. Once the link is re-attached, the relationship between the systems is reestablished based on a previous configuration such that each system will mutate to its appropriate server or client role.

Figure 3:
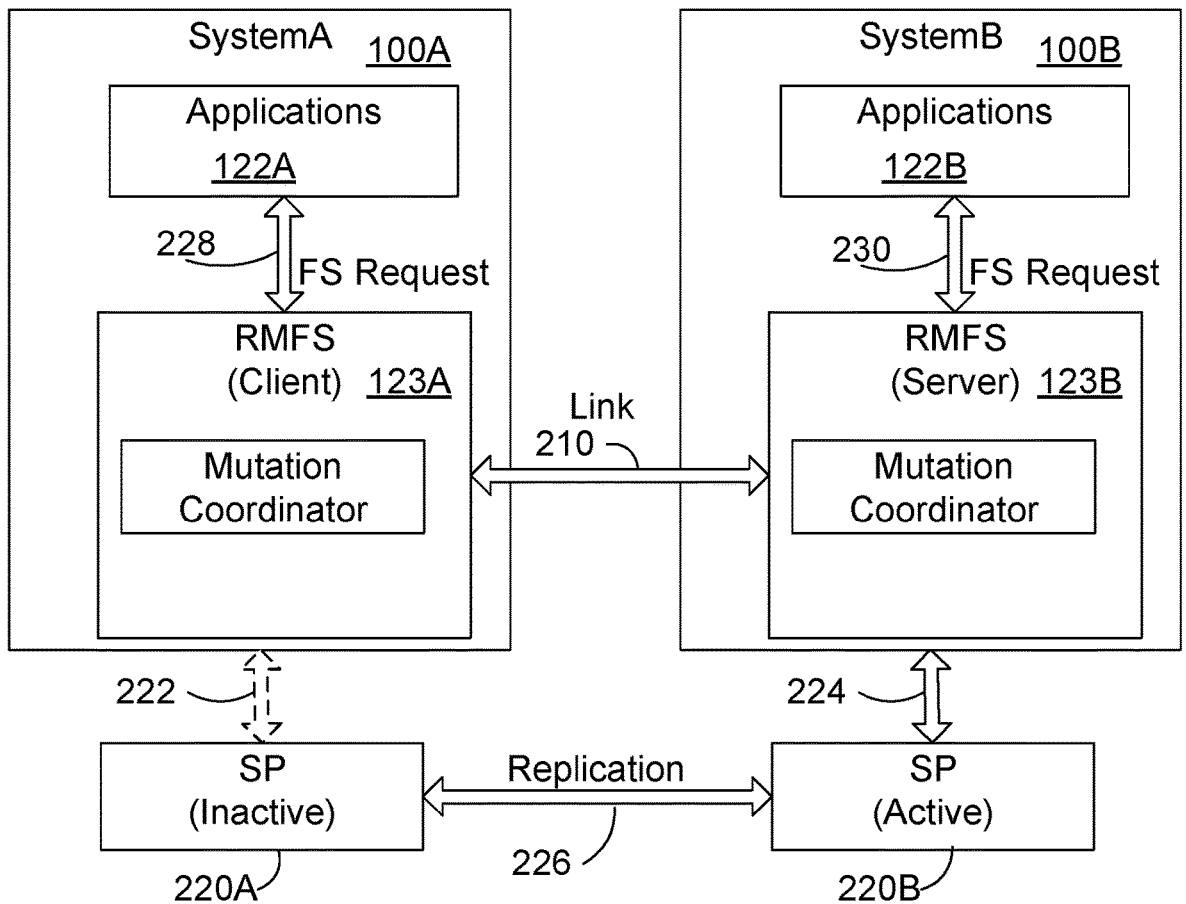
FIG. 3 illustrates the role mutable file system of FIG. 2 after mutation of the role of the two RMFS managers.
Figure 4:
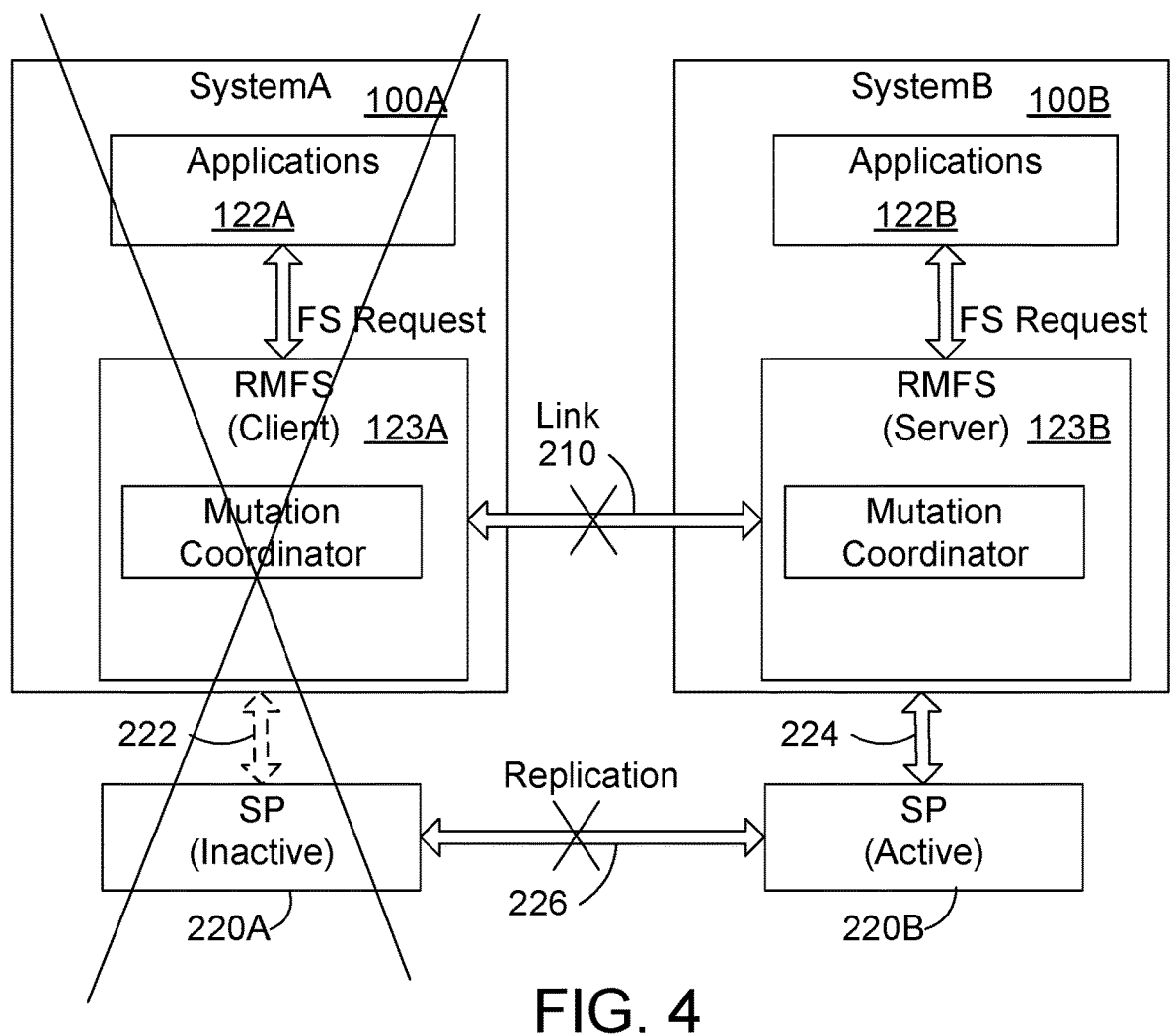
FIG. 4 illustrates the role mutable file system of FIG. 2 after detection of a failure event and the mutation coordinator swapping roles of the RMFS managers.

The role mutable file system 200 in FIG. 2 is shown in an initial state. FIG. 3 and FIG. 4 represent the same system in subsequent states as described below. In FIG. 2, the RMFS manager 123A is in the server role and the RMFS manager 123B is in the client role. With the RMFS manager 123A in the server role, the RMFS manager 123A handles file server requests 228 directly from applications 122A. File server requests 230 from applications 122B are initially processed through the RMFS manager 123B in the client role and then sent to the RMFS manager 123A over the communication link 210. The RMFS manager 123A then processes the file server requests to the active storage pool 220A. Thus all file server requests from the applications are handled by the RMFS manager 123A acting in the server role which is accessing the active server pool 220A that is continuously replicated to the inactive server pool 220B. The connection of interface 224 to the inactive storage pool 220B is shown as a broken line to indicate the connection is not active. The role mutable file system 200 will continue in this state until there is an event that triggers the RMFS managers to mutate roles. The events that may trigger the mutations are described further below. The RMFS managers 123A and 123B monitor for mutation events, and when the RMFS managers detect a trigger event, the RMFS managers instruct the mutation coordinator to seamlessly change or mutate their role from client to server, or server to client as described further below.

FIG. 3 represents the role mutable file system 200 as shown in FIG. 2 after detection of an event and then the mutation coordinator swapping roles of the RMFS managers. The process of the mutation coordinators swapping roles is described in further detail below. In FIG. 3, the RMFS manager 123A has mutated to the client role and the RMFS manager 123B has mutated to the server role. The RMFS manager 123B that is in the server role is connected to the now active storage pool 220B via interface 224. The RMFS manager 123A that is now in the client role remains connected to the now inactive storage pool 220A, via connection 222 which is shown as a broken line to indicate the connection is not active. The RMFS manager 123A must now access the active storage pool 220B through the link 210 and the RMFS manager 123B in the server role.

FIG. 4 represents the role mutable file system 200 as shown in FIG. 2 after detection of an event and the mutation coordinator swapping roles of the RMFS managers. In this example, it is assumed that the event was a failure of systemA 100A. This failure was detected by the RMFS manager 123B in system 100B. The RMFS manager 123B then requested the mutation coordinator 124B to mutate. The mutation coordinator 124B determined to mutate to a server role as shown. SystemA 100A is shown crossed out to indicate the system is not operational. Similarly the communication link 210 and the replication link 226 may also be non-operational due to systemA 100A being down.

There are three primary types of events that may result in a role mutation: system failure, communication link issues and application/product driven events. System failure events may include a primary system crash that takes down the RMFS manager running in server role. The event would be detected by the RMFS manager on the secondary system (client role) and it would trigger the mutation. The secondary system's RMFS would then mutate from client role to server role. When the system with the RMFS manager that previously operated in the server role recovers, the RMFS manager on this system will query the system attributes to realize that it previously crashed and it was a server mode RMFS and it now needs to return to operation as a client mode RMFS manager. The system attributes are described further below.

Communication Link Issues. If a problem is detected with the network communication infrastructure between the two systems (and the two RMFS), a configurable timeout may be used to allow communication to be re-established. This would allow the RMFS Manager and the system a chance to resolve the problem should it be a quick intermittent issue. If the timeout expires (network problem did not resolve itself in quick fashion), then the RMFS could mutate accordingly to the user configuration.

Application/Product driven events. The RMFS manager may be configured or integrated as part of an application, product or system. The RMFS manager may be explicitly told to mutate to a specific mode. For example, the RMFS manager may be instructed to do a planned role swap. In this example, the RMFS manager running in server role will become a client and the RMFS manager running as a client role will become a server. Preferably the mutation will take place in a simultaneous coordinated fashion on both systems. In a second example, the RMFS manager may be instructed to mutate to the stand-alone role. In this example, an application/system/product may instruct the RMFS managers to uncouple the RMFS system pair with the storage pool pair and run each RMFS manager in stand-alone role.

Figure 5:
FIG. 5 illustrates examples of system attributes.
Figure 6:
FIG. 6 illustrates examples of application attributes.

As introduced above, system attributes may be stored and used by the RMFS manager 123. For example, system attributes 127 may be stored in the system memory 120 as shown in FIG. 1. The system attributes may be maintained by the operating system 121 or other software in the system. The system attributes 127 may be used by the RMFS manager 123 to determine historical details and preferences. An example of system attributes 127 and their associated values are shown in FIG. 5. Similarly, the RMFS manager 123 may also use application attributes 125 as shown in FIG. 1. Examples of application attributes 125 are shown in FIG. 6. The application attributes 125 may be maintained by the RMFS manager 123 or other software in the system. In this example, the application attributes 125 are stored with the RMFS manager 124.

Using the example attributes in the tables above, the RMFS manager 123 could determine that there was a system crash and that the system is just starting back up since there are cleanup items that are required and startup processing has not finished yet. The RMFS manager can determine what role the RMFS manager 123 was previously in and that the RMFS manager needs to mutate to a new role. In this example the RMFS manager 123 could also key off of the application attribute MutateAfterSystemCrash to tell the RMFS manager what action to take, i.e. whether to mutate to server, mutate to client, stay the same or mutate to opposite of the previous role.

Figure 7:
FIG. 7 illustrates examples of user configurations.

As introduced above, the RMFS manager may use user configurations 126 that allow the user to set configuration preferences on how the RMFS manager is to operate under given conditions. The user configuration may be set by a user/administrator using a graphical user interface. The user configurations may be set in an application 122 that is associated with the role mutable file system. Examples of user configurations are shown in FIG. 7. Example user configurations include how long to time out for a connection outage to then execute a mutation, and whether to notify an administrator for a connection outage.

As introduced above, mutation is when the file system changes its role and operation type seamlessly in-flight and in coordination with the overall environmental scenario. Examples of mutation include a role swap occurring on both systems which could occur for system maintenance. Mutation could also occur in system down scenarios where a file system needs to mutate into a server role because the original server role system has failed. Again, this mutation is seamless such that the user is not aware that a mutation is occurring. When an event occurs that requires a mutation, this information may be relayed to a mutation coordinator. The mutation coordinator contains intelligence to use event-combination analysis to determine the current scenario such as a planned failover, system down or user initiated mutation. The mutation coordinator can query the outside environment to gain additional awareness of the overall systems' states. For example, the mutation coordinator can reference the system attributes, application attributes and user configurations described above. Once the situation is determined, mutation coordinator may then mutate the mount structures on both systems accordingly. Unlike traditional mounting and unmounting, the mutation herein does not tear down the mount structures but leaves them in a partial state for the role change. Once mutation begins, the mutation coordinator will begin executing pre-defined actions, based on role, to mount each file system again. The mount structures are then filled out to completion in respect to their role type and the new "mount" is finished. The nodes that logically track and manage objects in this environment are also updated to reflect their residing system's new role.

Additional details of the mutation coordinator will now be described. The mutation coordinator receives a signal from the RMFS manager to begin mutation. This signal could contain information on the target mode as well as a scenario indicator. For example, the signal may take the form:
MsgToMutationCoordinator::action=Mutate::
   currentMode=Client::targetMode=Server::
   reasonCode=primarySysFailure
After receiving the signal to commence mutation, the mutation coordinator begins to handle inflight communication operations. For example, the mutation coordinator could allow all operations in process or "in-flight" to progress to the nearest synchronization point or operation boundary. After handling operations in-flight, the mutation coordinator may then issue an instruction to halt operations. For example, the mutation coordinator may issue a stop-lock instruction to the RMFS managers to communicate with software applications where the software applications each check the stop lock instruction to know whether it is safe to proceed. The enforcement of this stop-lock will halt any new operations from starting to process. Stop-locks are known in the prior art. An example of a stop lock could be a condition mechanism in which all the operations would check and react to a condition either by waiting or proceeding with the operation.

After the stop-lock instruction, if the operation is a planned role swap, the storage pool that is active is turned off and placed into inactive state such that both storage pools are then inactive. The mutation coordinator then triggers code that begins changing the state of the RMFS manager. This could be done by sending a message to the RMFS manager. The mutation coordinator or the RMFS manager then updates internal structures for the new state of the RMFS manager. When file systems are unmounted, in traditional file systems they typically tear down the associated mount structures that mounted the storage pools. For the RMFS manager running in server mode, these Mount structures associated to the storage pools are not taken down but left in a skeleton state. Internal software structures are updated to reflect the new mode. In this case, the new server RMFS manager will fill out its skeleton mount structures in preparation for the activation of the storage pools on that system. The skeleton state means that during a mutation the structures are only partially torn down. When the mutation finishes and the role is known the skeleton mount structure can be completed. During this process, the skeleton structures would be very similar to FIGS. 8A and 8B in that some fields of the structure are known and filled in and others are blank or have a placeholder value. The skeleton structure may be filled in with completed data at a later time.

The mutation coordinator may then initiate a process to handle individual objects as described further below. The communication network is then refreshed and the mutation coordinator activates the storage pools connected to the RMFS manager in the server role. An Acknowledgement is sent over a system messaging framework to other components in the system that the new server RMFS manager is ready. The mutation coordinator releases the "Stop Lock" and issues a "Go Lock". This will allow new operations that were held due to the "Stop Lock" to now proceed. Inflight operation handling occurs to process those operations that were held in synchronization boundary points.

In some embodiments, the mutation coordinator 124 may need to process individual object structures stored in memory to reflect the current mode or role of the of the computer system or virtual node they reside in. As described above, data objects for both the client and server are stored in the replicated storage pool. However, object structures for these data objects are often stored in memory and managed by the operating system. The object structures include data related to the data objects to enable the applications to access the data objects stored in the storage pool. Thus there could be object structures related to the data objects in the storage pool in both the client and server system memory. In the illustrated example, these object structures would normally be stored in memory 120 by the operating system 121 shown in FIG. 1. The object structures may need to be processed and updated in relation to their access role. For example, objects being tracked on a client role RMFS are really "Ghost" objects since the real object exists on the system of the server role RMFS. The object structures on the client RMFS system are filled-in and converted to store and house the actual attributes of the real object when the RMFS is converted to the server role. An example of this conversion is described below.

Figure 8A:
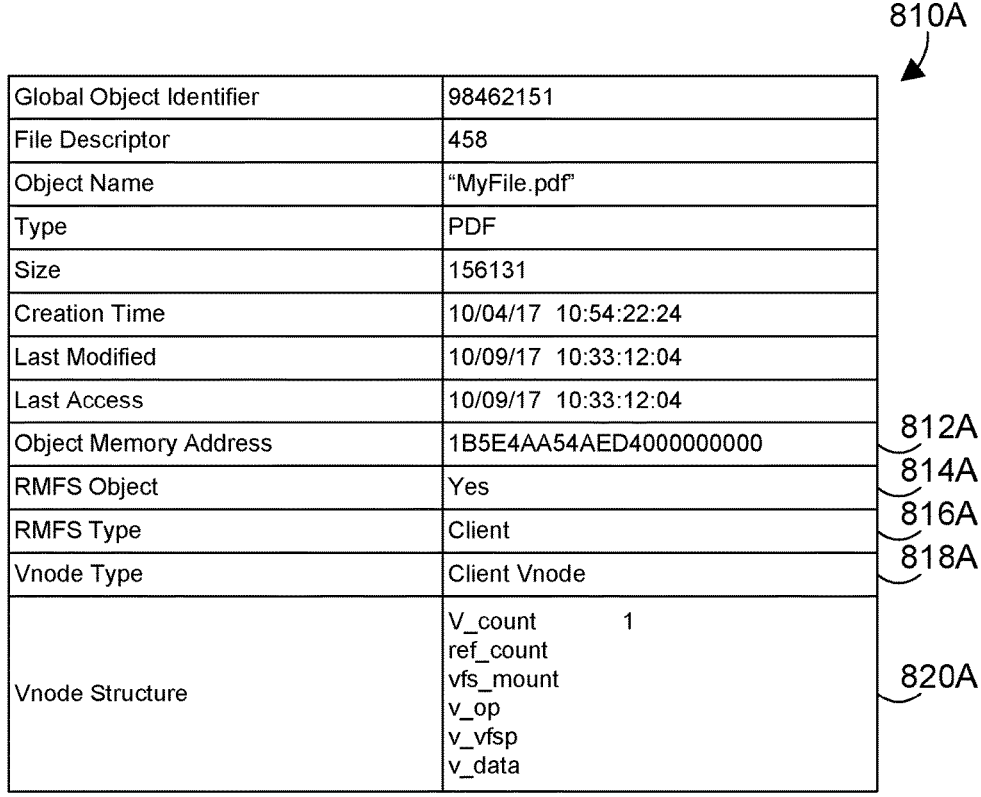
FIG. 8A and FIG. 8B show an example of updating an object structure when an RMFS is mutated from a client role to a server role.
Figure 8B:
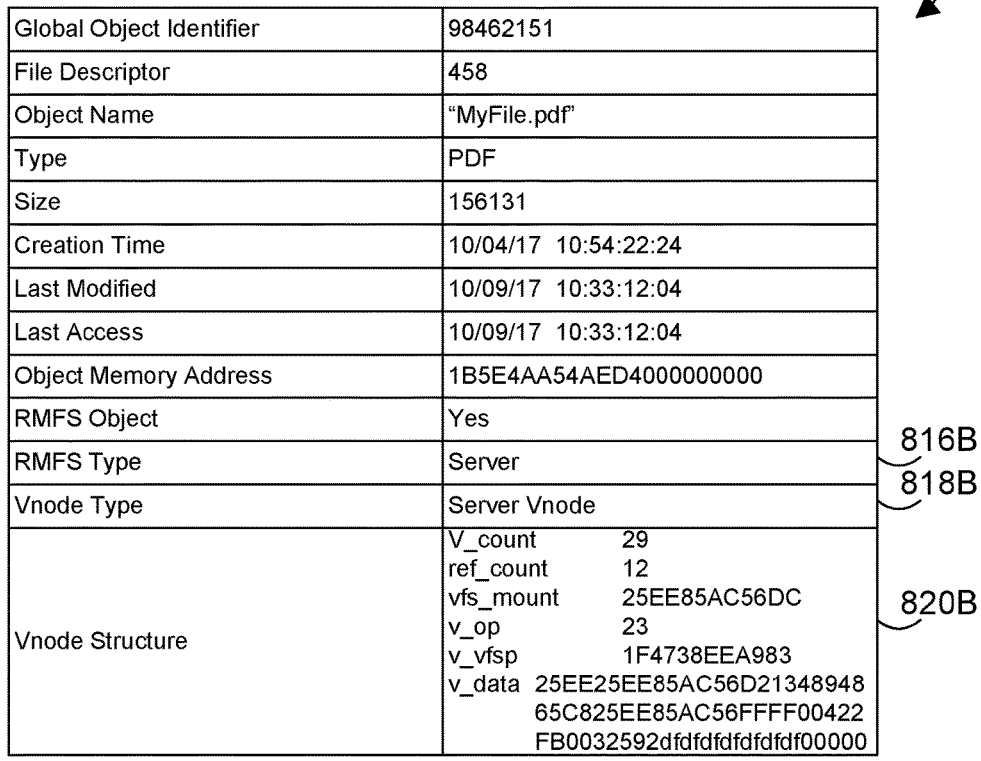

FIG. 8A and FIG. 8B show an example of updating an object structure on system 100B when the RMFS manager 123B is mutated from a client role (FIG. 2) to a server role (FIG. 3). FIG. 8A represents a simplified object structure 810A for a PDF file named "MyFile.pdf". An actual object structure may contain other fields not shown here. The PDF file is stored in the storage pool described above while the object structure 810A is stored in memory of the computer system 100B in FIG. 2. The object memory address 812A maps to a physical memory location on the storage pool 220. Since this object structure is located in systemB 100B, this means the data object on storage pool 220B is not accessible from this system. For any operations that manipulate this object, they would have to be sent as a request to the RMFS manager 123A on the server side 100A. The object structure field RMFSObject=yes 814A indicates that associated object is managed by the RMFS. The object structure field RMFSType 816A indicates that the current role is client. The client structure field VnodeType 818A indicates that the current virtual node of on systemB 100B is a client virtual node.

FIG. 8B shows an example of the updated object structure 810B after the system 100B is mutated from a client role to a server role. In this example, we assume the RMFS manager for this system has been instructed to mutate to a RMFS server role. This object will be processed along with all objects that are indicated to be client RMFS objects. These objects are processed to update their fields to reflect the new role of the RMFS manager for the associated computer system. Also, where client object structures are updated to server object structures, the "real" values need to be materialized and placed into the structure. In this example, the object structure in FIG. 8A is modified to reflect the object structure in FIG. 8B in conjunction with the RMFS manager mutating from the client role to the server role. Thus, the RMFS type 816B is changed to "Server", and the Vnode type is changed to "Server Vnode" 818B. The Vnode structure data 820B is copied from the corresponding object structure on computer systemA 100A where the corresponding RMFS manager 123A was previously in the server role.

Similarly, the object structures on systemA 100A would be modified to values as shown in FIG. 8A where the RMFS manager 123A on systemA 110A is mutated from the server role to the client role as shown in FIG. 3.

As introduced above with reference to FIG. 2, the RMFS managers 123A, 123B are each configured to a respective storage pool 220A, 220B. The storage pools 220 may be a single storage drive or an independent storage pool of drives. One example of an independent storage pool is an Independent Auxiliary Storage Pool (IASP) as known in the art. The storage pools are identically named and only a single storage pool is physically active at any given time. The pools are kept in synchronization and completely identical by suitable hardware replication technology known in the prior art.

The communication link 210 was introduced above with reference to FIG. 2. The communication link 210 is a high speed data link between the RMFS managers 123. The communication link 210 may be implemented in the communications network layer of the system software. An example of the communication link is a Remote Direct Memory Access (RDMA) on Converged Ethernet (RoCE) as known in the prior art.

Figure 9:
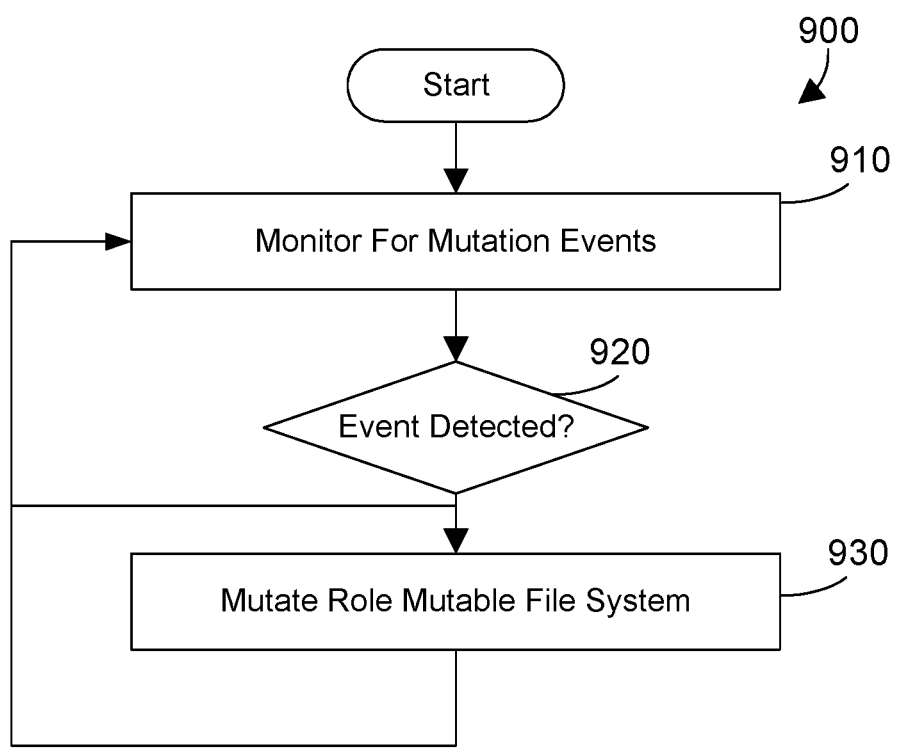
FIG. 9 is a flow diagram of a method performed by a role mutable file system manager.

Referring to FIG. 9, a method 900 shows one suitable example for a role mutable file system that provides high availability processing of network requests with systems that can seamlessly switch between server and client operational roles. Portions of method 900 are preferably performed by the RMFS managers 123A and 123B shown in FIG. 2. First, monitor the system for mutation events (step 910). If an event is not detected (step 920=no) then return to step 910. If an event is detected (step 920=yes) then mutate the role mutable file system (step 930). Control may then return to step 910.

Figure 10:
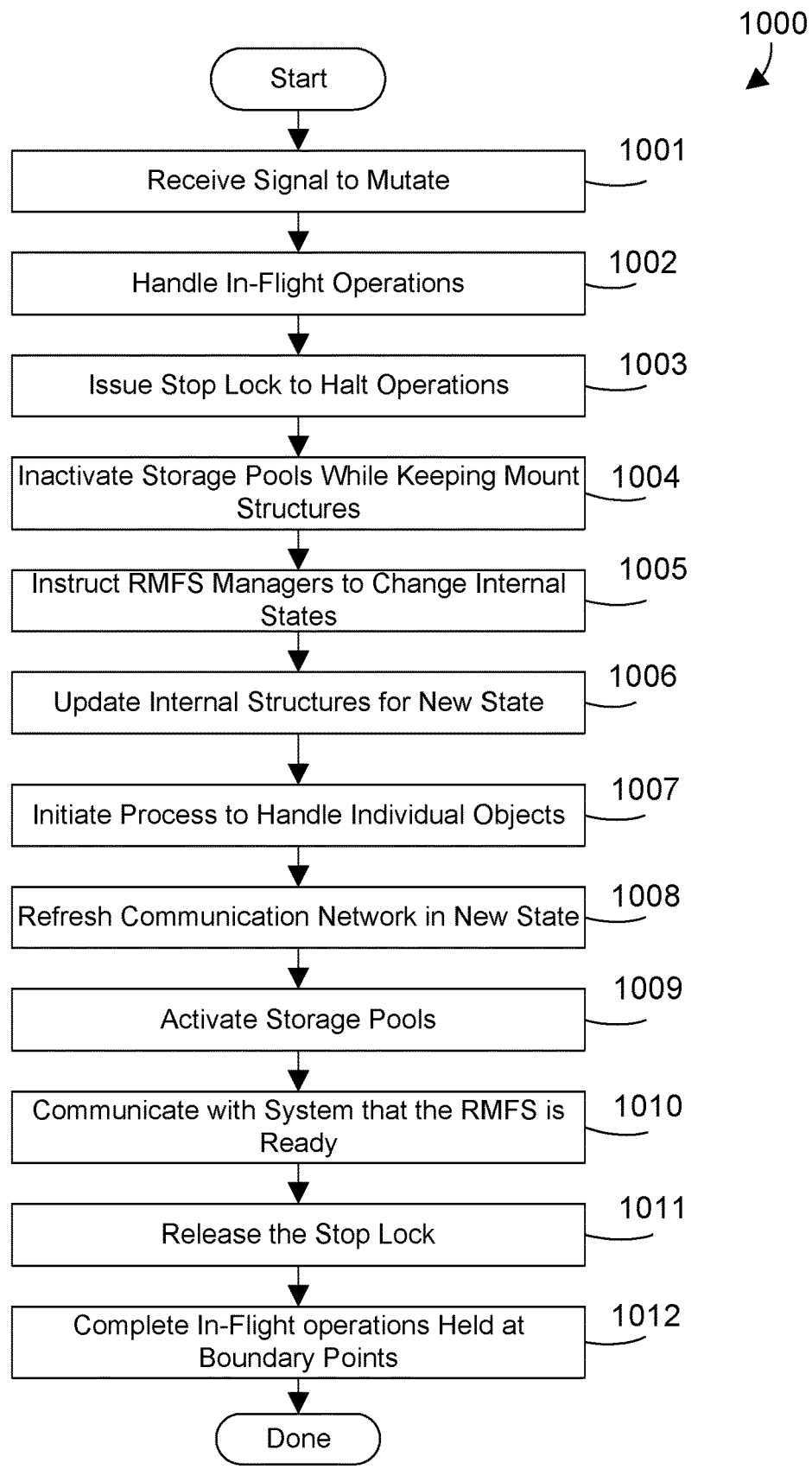
FIG. 10 is a flow diagram of a specific method for step 930 in FIG. 9.

FIG. 10 shows one suitable example of a method to mutate the role mutable file system. Method 1000 thus shows a suitable method for performing step 930 in method 900 in FIG. 9. First, receive a signal to mutate the role (step 1001). Handle in-flight operations (step 1002). Issue stop-lock to halt operations (step 1003). Issue stop lock to halt operations (step 1003). Inactivate storage pools while keeping mount structures (step 1004). Instruct RMFS managers to change internal state (step 1005). Update internal structures for new state (step 1006). Initiate process to handle individual objects (step 1007). Refresh communication network in new state (step 1008). Activate storage pools (step 1009). Communicate with system that the role mutable file system is ready (step 1010). Release the stop lock (step 1011). Complete in-flight operations held at boundary points (step 1012). The method 1000 is then done.

Figure 11A:
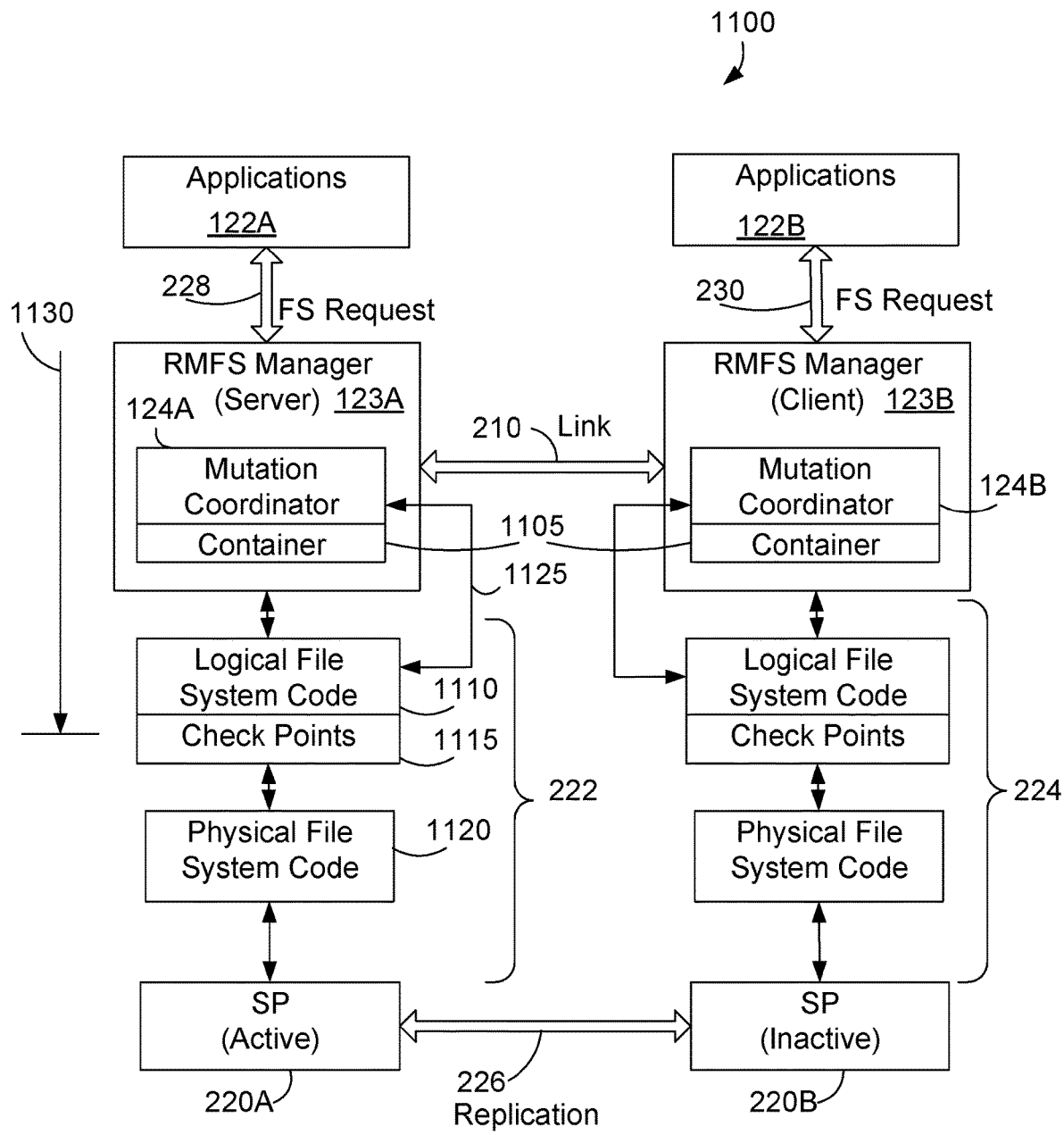
FIG. 11A and FIG. 11B show an example of processing in-flight operations when an RMFS is mutated from a server role to a client role.
Figure 11B:
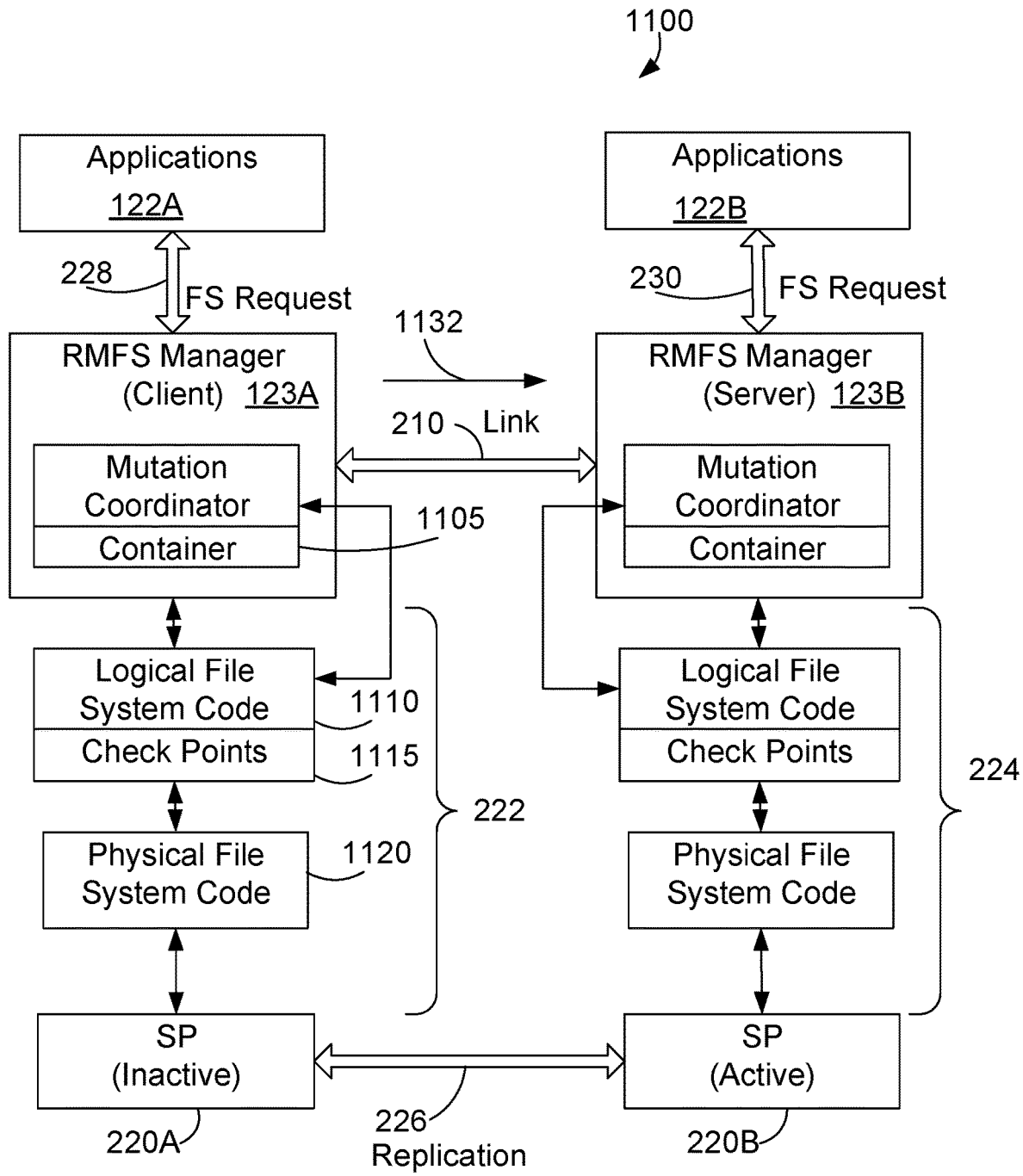

FIG. 11A and FIG. 11B together illustrate an example of processing in-flight operations when the RMFS managers in the system mutate between the server and the client roles. FIG. 11A and the description below provide details of the initial handling of the in-flight operations of step 1002 in FIG. 10. FIG. 11B and the description below provide details of the completion of the in-flight operations of step 1012 in FIG. 10.

FIG. 11A represents a portion 1100 of the role mutable file system 200 shown in FIG. 2. In this example, the RMFS 1100 is in an initial state with the RMFS manager 123A in the server role and the RMFS manager 123B in the client role. With the RMFS manager 123A in the server role, the RMFS manager 123A handles file server requests 228 directly from applications 122A as described above. File server requests 230 from applications 122B are initially processed through the RMFS manager 123B in the client role and then sent to the RMFS manager 123A over the communication link 210 as described above. In this example, the RMFS manager 123A and the RMFS manager 123B each include a mutation coordinator 124 as described above. The mutation coordinators 124 each include a container 1105. The containers 1105 are used to track in-flight operations between the RMFS managers 123 and the storage pools 220 as described further below. As used herein, in-flight operations are those that are in the midst of being processed by the RMFS managers 123 upon the receipt of a signal to mutate roles as described above. The containers 1105 may be any suitable data structure such as a queue in memory that is available to the mutation coordinators 124.

Again referring to FIG. 11A, the connections 222, 224 introduced in FIG. 2 have been expanded to show an example for these connections and further illustrate tracking in-flight operations. The connections 222, 224 connect the RMFS managers 123 to the storage pools 220. The connections 222, 224 may include logical file system code 1110 with checkpoints 1115 and physical file system code 1120. The physical file system code is code at the physical layer of the operating system code that communicates with the storage pool as known in the prior art. The logical file system code 1110 is code at the logical layer of the operating system similar to that known in the prior art and modified as described herein. The checkpoints 1115 in the logical file system code 1110 operate in conjunction with the mutation coordinator 1124 and the container 1105 of the respective RMFS manager 123 to track in-flight operations and insure that all operations are paused and then completed after the role of the RMFS manager is mutated. The check points 1115 communicate 1125 with the mutation coordinator to provide data which is stored in the containers to handle the in-flight operations.

Again referring to FIG. 11A, an example of handling in-flight operations of step 1002 in FIG. 10 will be described. In FIG. 11A, it is assumed that the applications 122A have sent one or more FS requests 228 to the RMFS manager 123A in the server role. While the RMFS manager 123A is in the midst of processing these operations, we assume a request is made to mutate the role of the RMFS managers 123. Operations that have not been started are handled as described above. Operations that are in-flight are represented by the arrow 1130 ending in the midst of the check points 1115 in the logical file system code 1110. The check points 1115 are functions within this code that communicate with the mutation coordinators 124 to track the inflight operations 1130. The mutation coordinator coordinates the in-flight operations to each stop at a next encountered check point in the code and hold at that point until the role mutation of the RMFS managers 124 is completed. An example of the logical file system code 1110 with the checkpoints is described further below with reference to FIG. 12. FIG. 11B illustrates the state of the RMFS system 1100 after mutation of the roles of the RMFS managers 123. At this point, the RMFS manager 123A is now in the client role and the RMFS manager 123B is in the server role. When the mutation is complete, the RMFS manager 123A now in the client role sends 1132 stored data of the operations that were stored in the container 1105 over the link 210 to be processed by the RMFS manager 123B on the now active storage pool 220B. The RMFS manager 123B now in the server role would process any in-flight operations that were stored in its local container locally on the local active storage pool 220B.

FIG. 12 shows an example 1200 of simplified code for the logical file system to process in-flight operations. The example code 1200 is presented as the function "Logical File Operation1" 1202. The example code 1200 is highly simplified code to represent the function described herein. After some initial code 1204, the first check point 1206 is encountered. Additional check points such as 1208, 1210 can be placed at intervals in the code. The other lines of code 1212 represent the body of the function and are merely shown for reference. Each of the checkpoints are shown as a function call. For example the first checkpoint 1206 calls a function sync_checkpoint1. The checkpoint function would determine whether to hold the operation at the checkpoint by communicating with the mutation coordinator. For example, the mutation coordinator could broadcast a message to the operations to hold at the next checkpoint they encounter. The checkpoint functions may log results of the code up to the checkpoint and other information needed to resume the operation as described below.

FIG. 13 shows a simplified example of a file operation data structure 1300 stored in the container 1105 in FIG. 11A. The left column represents the name of a data element and the right column represents the corresponding data. The illustrated operation data structure includes an OperationID, OperationType, OperationParameterBuffer, TargetObjectAddress, OperationSpecificBuffer, VnodeBuffer, designation of the originating file system (OriginatedOn), CheckpointFunctionID, Start/ResumeCheckpoint, and metadata. This data may be used by the RMFS manager to resume the operation after the mutation as described above. When a checkpoint function is called, the communication between the mutation coordinator and the checkpoint function will result in the creation of the file operation data structure entry into the container. Any meta data from the checkpoint function may also be placed into the operation's data structure so it's progress and restart points can be referenced. All in-flight operations may have a corresponding entry in the container as shown by the example in FIG. 13. The checkpoint functions will ensure that the information in the container is accurate at the point of the operation pausing at the checkpoint boundary.

Figure 14:
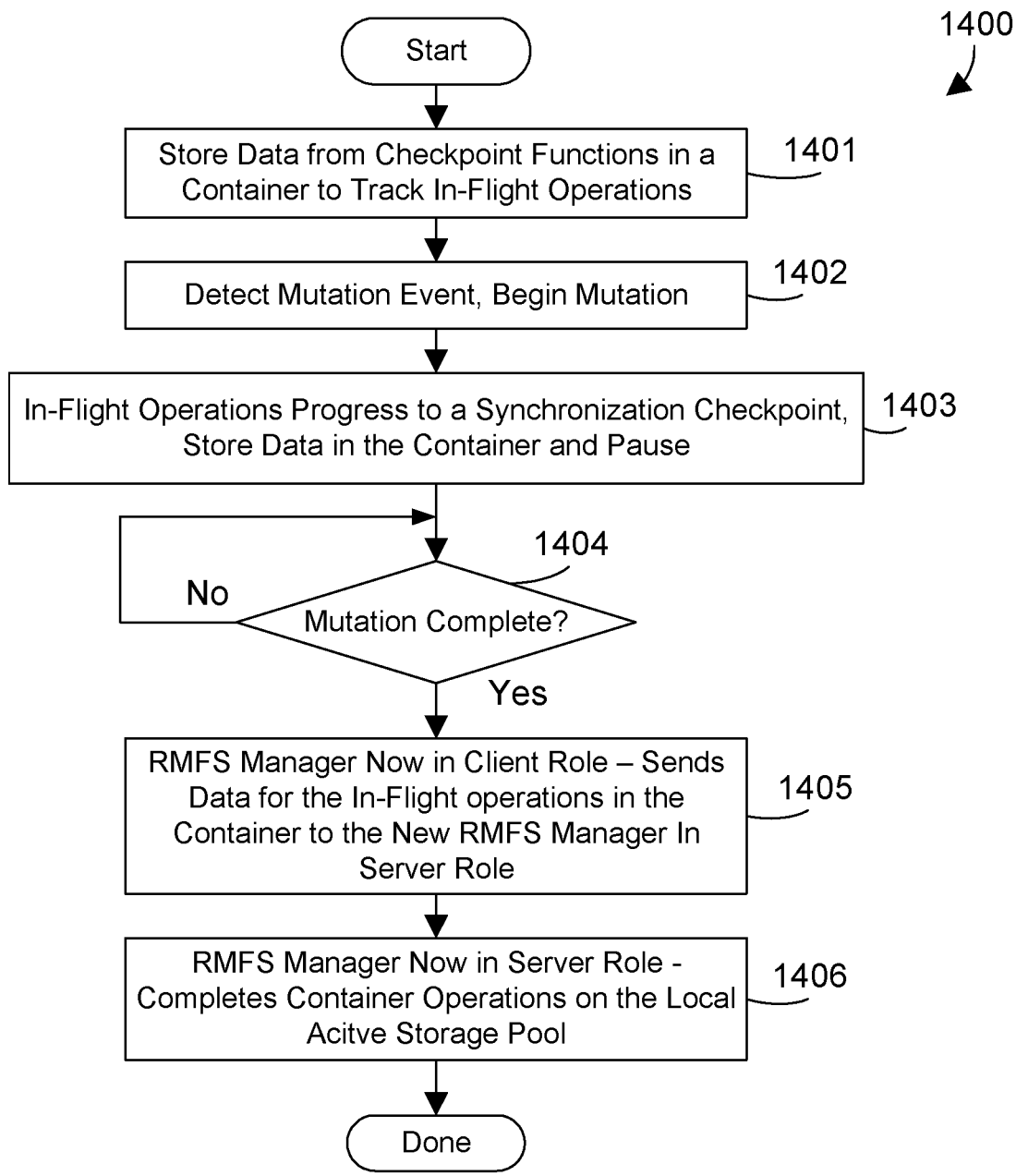
FIG. 14 is a flow diagram of a method performed by a mutation coordinator in the role mutable file system manager to process in-flight operations.

Referring to FIG. 14, a method 1400 shows one suitable example of a method performed by a mutation coordinator to process in-flight operations while the RMFS managers 124 mutate between server and client operational roles. Portions of method 1400 are preferably performed by the mutation coordinators 124 and the logical file system code 1110. First, store data in a container from checkpoint functions to track in-flight operations (step 1401). Next, detect a mutation event and begin changing the role of the RMFS manager (step 1402). In-flight operations then progress to a synchronization checkpoint, store data in the container and pause (step 1403). If the mutation is not complete (step 1404=no) then return to step 1404 and wait until the mutation is complete. When the mutation is complete (step 1404=yes) then the RMFS manager now in the client role sends data for the in-flight operations from its container to the new RMFS manager in the server role (step 1405). The RMFS manager now in the server role completes operations from data in its container on its now active local storage pool (step 1406). The method is then done.

This disclosure describes a mutation coordinator that uses a container of data received from in-flight operations as they progress past checkpoints to enable the file system to seamlessly mutate between server and client operational roles. The checkpoints log information in the container to reflect the progress of the operation and determine whether the operation should halt at the checkpoint when a mutation begins. The halted operations are then completed on the new server when the mutation is complete.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer apparatus comprising:
a first computer system with a first processor, a first memory coupled to the first processor, a first mutation coordinator residing in the first memory and executed by the first processor wherein the first mutation coordinator tracks in-flight operations in a first container accessible to the first mutation coordinator;
logical file system code with checkpoint functions located at synchronization checkpoints in the logical file system code wherein the checkpoint functions store in-flight operation data in the first container accessible to the first mutation coordinator;
upon detection of a mutation event, the first mutation coordinator begins mutation to change a role of the first computer system from a server role to a client role;
the in-flight operations then progress to a next synchronization checkpoint, the first mutation coordinator stores the in-flight operation data in the first container and pauses until mutation of the state change is complete; and
upon completion of the mutation to a client role, the first mutation coordinator sends the in-flight file operation data in the container to a second computer system now in the server role.

2. The computer apparatus of claim 1 wherein the in-flight operations are file server requests from an application in the first memory of the first computer system.

3. The computer apparatus of claim 1 wherein the checkpoint functions are at various intervals in logical file system code of the first computer system, wherein the logical file system code communicates with a first storage pool connected to the first computer system.

4. The computer apparatus of claim 3 wherein the first storage pool and the second storage pool are an Independent Auxiliary Storage Pool (IASP).

5. The computer apparatus of claim 1 wherein the mutation event comprises: a system failure, a communication link issue, and an application/product driven event.

6. The computer apparatus of claim 1 further comprising:
a second computer system with a second processor, a second memory coupled to the second processor, a second mutation coordinator residing in the second memory and executed by the second processor wherein the second mutation coordinator tracks in-flight operations in a second container accessible to the second mutation coordinator;
logical file system code with checkpoint functions located at synchronization checkpoints in the logical file system code wherein the checkpoint functions store in-flight operation data in the second container accessible to the second mutation coordinator;
upon detection of a mutation event, the second mutation coordinator begins mutation to change a role of the second computer system from a client role to a server role;
the in-flight operations then progress to a next synchronization checkpoint, the second mutation coordinator stores the in-flight operation data in the second container and pause until mutation of the state change is complete; and upon completion of the mutation to a server role, the second mutation coordinator processes the in-flight file operation data in the second container at a local storage pool.

7. The computer apparatus of claim 1 wherein the in-flight operation data comprises results of the logical file system code up to a corresponding checkpoint and information needed to resume the in-flight operations after the mutation is complete.

8. The computer apparatus of claim 7 wherein the in-flight operation data comprises: an operation identification, an operation type, a target object address, a designation of the originating file system, and a resume checkpoint.

9. The computer apparatus of claim 8 wherein the in-flight operation data further comprises meta data from the checkpoint function to record the in-flight operations progress and restart points.

10. A computer-implemented method executed by at least one processor that processes in-flight operations in a role mutable file system comprising:
   storing data in a container to track in-flight operations wherein the data is provided by checkpoint functions located at synchronization checkpoints in logical file system code of a first computer system;
   detecting a mutation event;
   begin mutation to change a role of the first computer system from a server role to a client role;
   processing in-flight operations to a synchronization checkpoint in the logical file system code, storing in-flight operation data in the first container and pausing at the synchronization checkpoint until mutation of the state change is complete; and
   upon completion of the mutation to a client role, sending the in-flight file operation data in the container to a second computer system now in the server role.

11. The method of claim 10 wherein the in-flight operations are file server requests from an application in a first memory of the first computer system.

12. The method of claim 11 wherein the checkpoint functions are at various intervals in the logical file system code of the first computer system, and wherein the logical file system code communicates with a first storage pool connected to the first computer system.

13. The method of claim 10 wherein the first storage pool and the second storage pool are an Independent Auxiliary Storage Pool (IASP).

14. The method of claim 10 wherein the mutation event comprises: a system failure, a communication link issue, and an application/product driven event.

15. The method of claim 14 further comprising:
   storing data in a second container to track in-flight operations wherein the data is provided by checkpoint functions located at synchronization checkpoints in logical file system code of a second computer system;
   detecting a mutation event and begin mutation to change a role of the second computer system from a client role to a server role;
   processing in-flight operations to a synchronization checkpoint in the logical file system code, storing in-flight operation data in the second container and pausing at the synchronization checkpoint until mutation of the state change is complete; and
   upon completion of the mutation to a server role, processing on the second computer system the in-flight file operation data in the second container at a local storage pool.

16. The method of claim 10 wherein the in-flight operation data comprises results of the logical file system code up to a corresponding checkpoint and information needed to resume the in-flight operations after the mutation is complete.

17. The method of claim 16 wherein the in-flight operation data comprises: an operation identification, an operation type, a target object address, a designation of the originating file system, and a resume checkpoint.

18. The method of claim 17 wherein the in-flight operation data further comprises meta data from the checkpoint function to record the in-flight operations progress and restart points.

19. A computer-implemented method executed by at least one processor that processes in-flight operations in a role mutable file system comprising:
   storing data in a container to track in-flight operations wherein the data is provided by checkpoint functions located at synchronization checkpoints in logical file system code of a first computer system;
   detecting a mutation event and begin mutation to change a role of the first computer system from a server role to a client role;
   processing in-flight operations to a synchronization checkpoint in the logical file system code, storing in-flight operation data in the first container and pausing at the synchronization checkpoint until mutation of the state change is complete;
   upon completion of the mutation to a client role, sending the in-flight file operation data in the container to a second computer system now in the server role;
   storing data in a second container to track in-flight operations wherein the data is provided by checkpoint functions located at synchronization checkpoints in logical file system code of a second computer system;
   detecting a mutation event and begin mutation to change a role of the second computer system from a client role to a server role;
   processing in-flight operations to a synchronization checkpoint in the logical file system code, storing in-flight operation data in the second container and pausing at the synchronization checkpoint until mutation of the state change is complete; and
   upon completion of the mutation to a server role, processing on the second computer system the in-flight file operation data in the second container at a local storage pool.

20. The method of claim 19 wherein the in-flight operation data comprises results of the logical file system code up to a corresponding checkpoint and information needed to resume the in-flight operations after the mutation is complete including the following: an operation identification, an operation type, a target object address, a designation of the originating file system, a resume checkpoint and metadata.

* * * * *